Sept. 29, 1970                         B. WETZEL                        3,530,647
                        APPARATUS FOR CONTROL OF AIR POLLUTION
Filed Feb. 1, 1965                                                  4 Sheets-Sheet 4
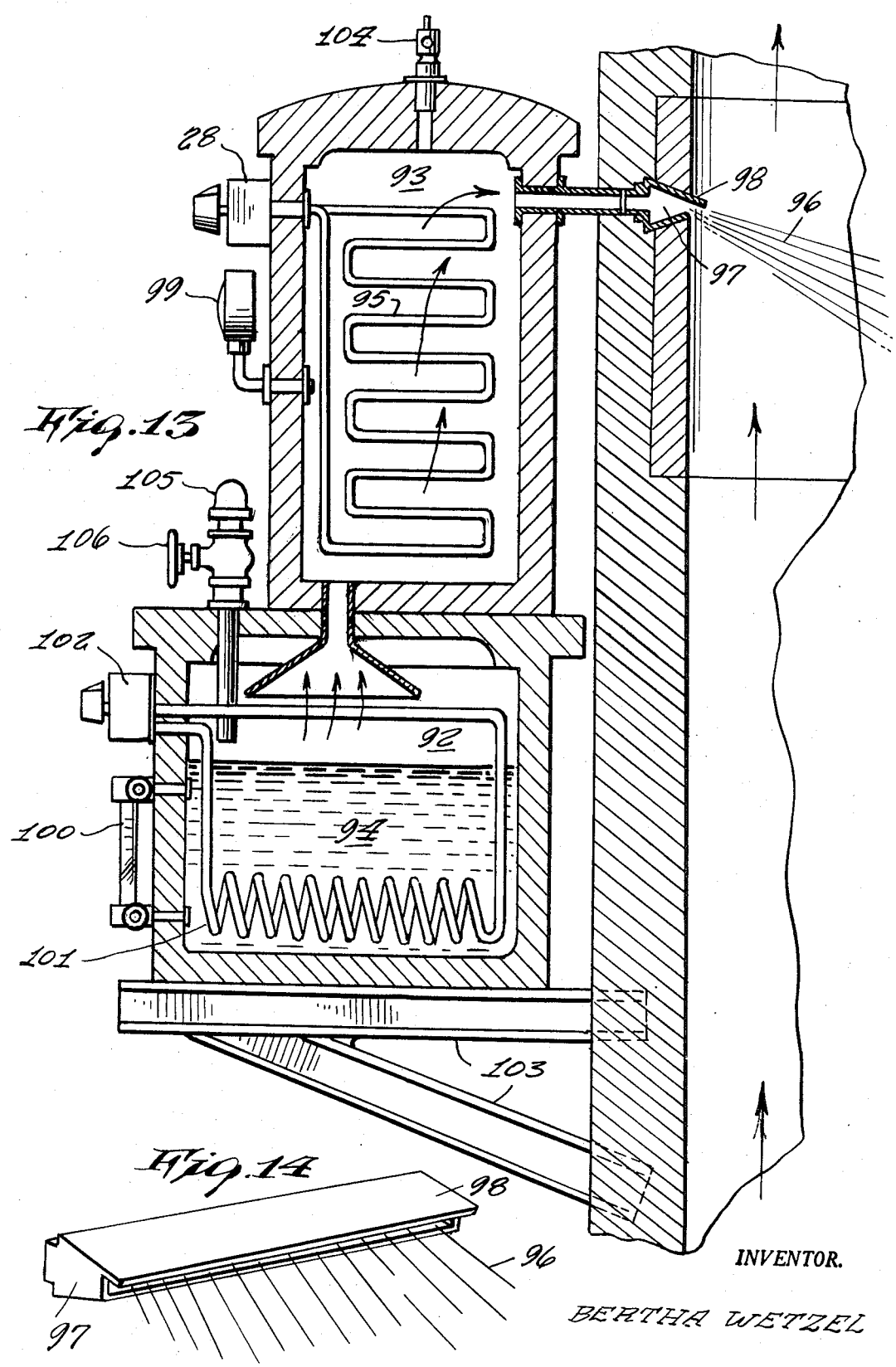
INVENTOR.
BERTHA WETZEL

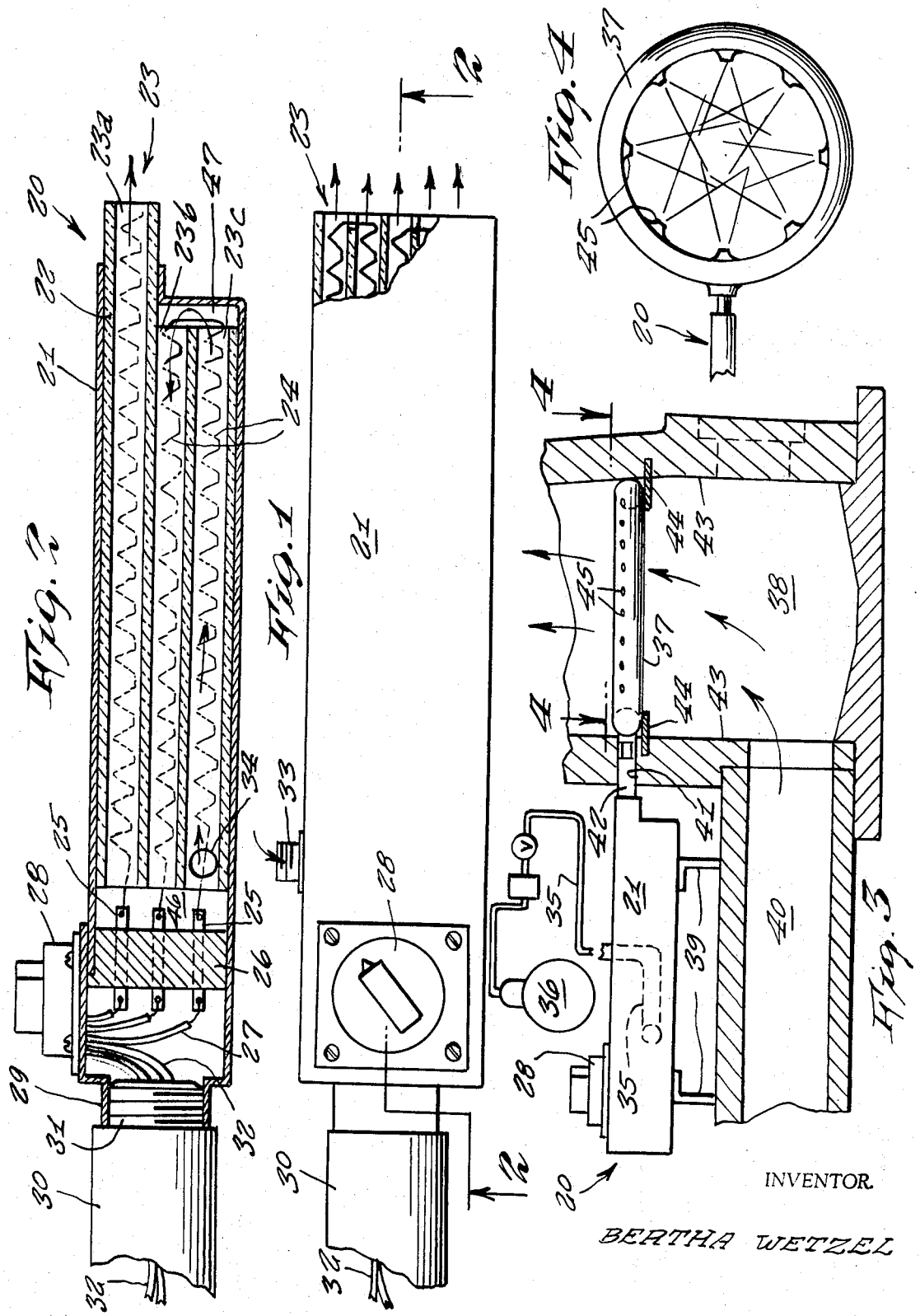

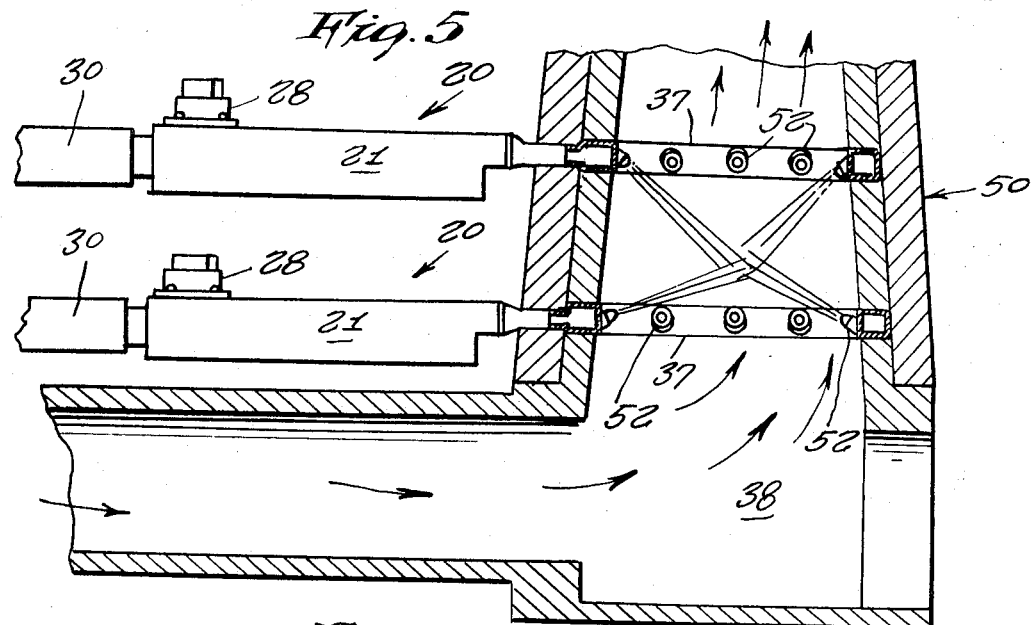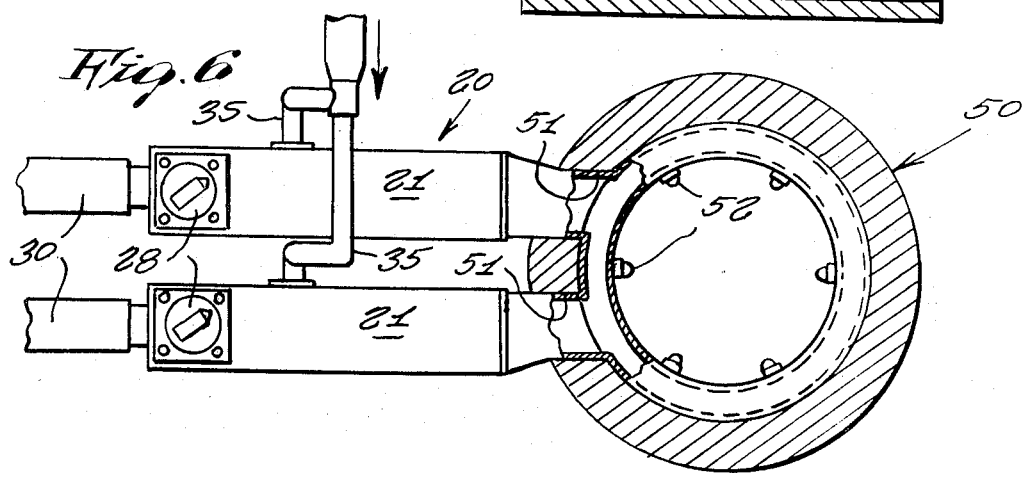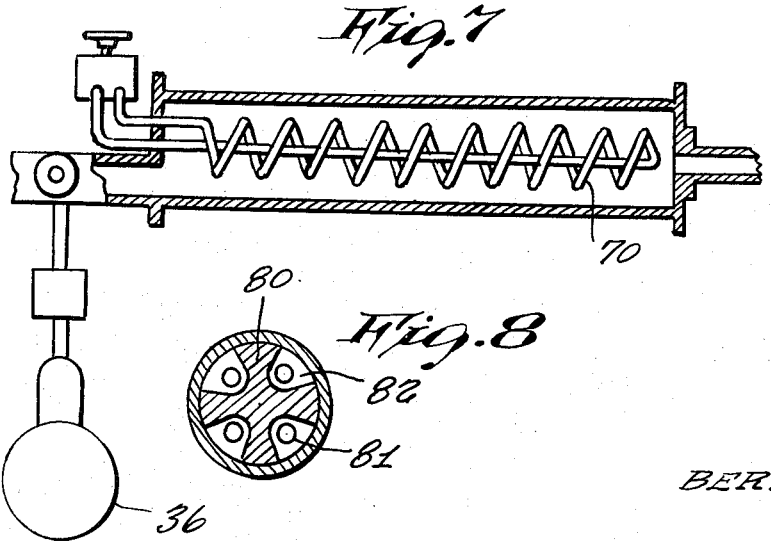

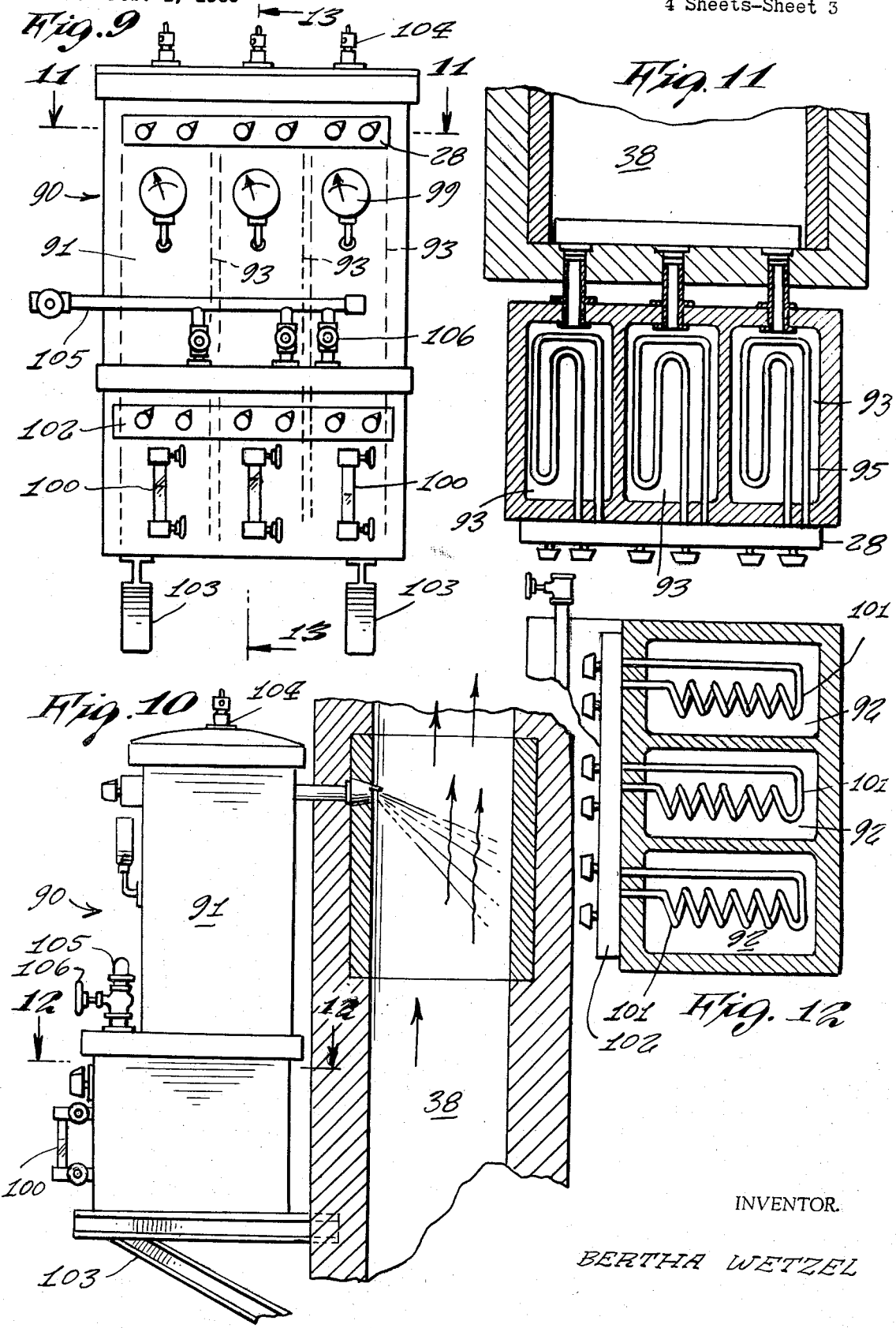

United States Patent Office

3,530,647
Patented Sept. 29, 1970

3,530,647
APPARATUS FOR CONTROL OF AIR POLLUTION
Bertha Wetzel, 2840 Bailey Ave., Bronx, N.Y. 10463
Filed Feb. 1, 1965, Ser. No. 429,524
Int. Cl. B01d 51/00
U.S. Cl. 55—263                                      3 Claims

ABSTRACT OF THE DISCLOSURE

A device for dissolving and disintegrating incomplete products of combustion, the device being a flue having an interior peripheral wall, a hollow steam distributor ring mounted peripherally in the flue wall having its surface substantially flush with the interior wall of the flue, the ring having a plurality of spaced apart distributor nozzles protruding radially inwardly beyond the interior wall of the flue, a conduit passing through the flue wall and connecting the ring to a source of superheated steam.

---

This invention relates generally to apparatuses for controlling the pollution of the atmosphere caused by chimneys and automotive exhausts.

It is generally well known that air pollution occurs from incomplete combustion in furnaces and in automobile engines causing impurities to be discharged into the atmosphere which affect general health when breathed over long periods of time such as is especially prevalent for large city dwellers where vast numbers of building chimneys, industrial plant chimneys and large numbers of automatic vehicles discharge soot laden gas and smoke into the air. It is well known that respiratory ailments are more prevalent in the cities and these conditions are particularly aggravated by the nature of the air breathed. Additionally smog is created over cities when such polluted air is unable to be blown away and buildings become sooted causing an unsightly appearance.

Such conditions are of course undesirable and remedies for their control have been proposed and tried with varying degrees of success. However, an ideal solution has had to be yet attained wherein all the objectionable impurities could be withheld from entering into the air and wherein apparatus for such control could be efficiently made and used for all conditions.

In view of this it is a principal object of the present invention to provide an apparatus for the control of atmospheric pollution having self contained means to prevent completely the escape into the air of all solid matters contained in waste gases, soot or smoke from dwellings and industrial chimneys as well as automotive vehicle exhausts and exhausts of various kinds of engines.

Another object is to provide an apparatus for the control of atmospheric pollution which is of practical principle so that it can be feasibly incorporated into chimneys or other places where contaminated gases are being driven into the air.

Another object is to provide an apparatus for the control of air pollution which employs the use of superheated steam to precipitate all solid waste particles from the exhausts gas thereby rendering it pure prior to its entry into the air.

Other objects are to provide an apparatus for control of air pollution which is simple in design, relatively simple to manufacture, rugged in construction, easy to operate and efficient in use, safe and cleansing.

These and other objects will become readily apparent upon a study of the following specification and the accompanying drawings wherein:

FIG. 1 is a top plan view of the present invention.
FIG. 2 is a cross section thru 2—2 of FIG. 1.
FIG. 3 shows the device in use on a chimney.
FIG. 4 is a cross section thru 4—4 of FIG. 3.
FIG. 5 is a modified form of the invention shown in FIG. 3.
FIG. 6 is a plan view of another modification.
FIG. 7 is a modified form of the invention.
FIG. 8 is a cross section showing the steatite body and spiral heating wire.
FIG. 9 is a front elevation view of a modified application of the invention to a larger structure.
FIG. 10 is a side view thereof.
FIG. 11 is a cross section thru 11—11 of FIG. 9.
FIG. 12 is a cross section thru 12—12 of FIG. 10.
FIG. 13 is a cross section thru 13—13 of FIG. 9.
FIG. 14 is a perspective view of the nozzle shown in FIG. 13.

Referring now to the drawings in detail the numeral 20 represents an apparatus for control of air pollution according to the present invention wherein there is a metal housing 21 which contains a multihole ceramic body of a superheater 22. The superheater contains a plurality of cylindrical canals 23 within each of which there is a radiation coil 24. The coils are formed of loops that are of triangular configuration to permit a maximum of radiaiton within the cylindrical canals. The canals are arranged in three tiers 23a, 23b and 23c and on each tier there are a plurality of like canals. The radiation coils are connected together in series and the terminal ends of the connected series of coils are connected to one side of terminal lugs 25 supported on an insulated block 26. The lugs project through the block and on their opposite ends are connected to electric wires 27 leading to a multi-heat switch 28 mounted on the housing 21. The end 29 of the housing is internally threaded and a hollow tubular handle 30 having external thread 31 is secured thereupon. Electric wires 32 extend through the handle from an electric power source (not shown) and are connected to the switch 28.

One one side of the housing 21 there is a threaded steam inlet fixture 33 which communicates with a transverse extending opening 34 in the ceramic superheater. As shown in FIG. 3, a steam pipe 35 is connected at one end to fixture 33 and the opposite end of pipe 35 is connected to a steam generator 36. It is to be noted that the supercharger projects forwardly at one end of canals 23a and this end is connected to a distributor tube 37 fitted into a chimney 38.

The housing 21 is mounted upon a pair of brackets 39 supported upon a flue 40 of a furnace (not shown); the flue communicating with the interior of vertical chimney 38 (as shown in FIG. 3). An opening 41 is provided in the side of the chimney and an intake pipe 42 of distributor tube 37 is fitted therethrough. The distributor tube 37 comprises a hollow tube of rectangular circuit to fit around and adjacent the inner sides 43 of the chimney. A plurality of supports 44 may be driven into the mortar between the bricks of the chimney and the distributor tube supported thereupon. The distributor tube is provided with a plurality of jet openings 45 around the circuit thereof, the jets being directed upwardly toward the chimney outlet.

It is to be noted that communicating chambers 46 and 47 are provided at opposite ends of canals 23 to permit circuit of supercharged steam through the canals.

In operative use superheated steam is delivered through opening 34 at a predetermined rate to correspond to an electric voltage within the radiation coil. The steam driven through the canals is finally discharged into the distributor tube and out of the jets into the chimney. The superheated steam dissolves and disintegrates the impurities in the chimney gases.

As shown in FIG. 4 the tube distributor may be of circular configuration and the jets are directed to cross fire the steam into all directions so as to fully cut across the path of the chimney gases. In a modified form of the invention a chimney 50 is shown wherein there are a plurality of side openings 51 each of which is associated with a complete individual apparatus 20. Thus a plurality of structures above described are used with each chimney. These apparatus 20 may be located one over another (as shown in FIG. 5) or in side by side position (as shown in FIG. 6).

In a further modified construction shown in FIG. 7 an electrically energized resistive conductor of novel design is used as shown.

It is to be noted that the jets 52 shown in FIG. 5 are vertically tilted downwardly on the upper distributor and vertically tilted upward on the lower distributor thereby concentrating their aim toward a central mid point therebetween.

In FIG. 8 a steatite body 80 is shown which is heat resistant. Spiral heating wire 81 is positioned within 4 canals 82 circumferentially spaced around the steatite body.

In FIGS. 9 to 13 a modified form 90 of the invention is shown which is adapted for large installations wherein large quantities of gases are to be purified. In this construction there is a housing 91, at the lower part of which there are several cells 92 comprising water evaporating tanks for better regulation of quantity of evaporated water. In the upper part thereof there are several cells 93 comprising superheating chambers provided for the purpose of assuring continuous steam generation. Water 94 in cells 92 evaporates up into cells 93 wherein electrical tubular heating elements 95 are contained. Supercharged steam 96 is delivered directly into the chimney out of nozzle 97 having a deflector shield 98 which directs the steam angularly downward. In this device 99 is a temperature indicator and pressure gage; 100 is a water level gage and 101 is an electrical water heater controlled by a switch 102. The device 90 is mounted upon a bracket 103 attached to the chimney. Additionally the device 90 includes safety valves 104 and a water feed line 105 to each cell controlled by valves 106.

While various changes may be made in the detail construction, it is understood that such changes will be in the spirit and scope of the present invention as is defined in the appended claims.

I claim:

1. An apparatus for dissolving and disintegrating incomplete products of combustion comprising a flue wall having an internal surface in combination with a hollow steam distributor ring mounted peripherally in the flue wall having spaced outlet nozzles protruding radially beyond the surface, including an exterior intake to the distributor adapted for connection to a superheated steam generator, said intake extending outward through the flue wall and in communication with the hollow ring.

2. An apparatus as in claim 1 in further combination with a second steam distributor ring, longitudinally spaced at a predetermined distance from the first said ring, said second ring having outlet nozzles inclined relative to the flue axis whereby one component of the nozzle inclination is radial and another component is axial towards the first ring, and whereby the outlet nozzles of the first said ring are also inclined in an axial direction towards the second said ring thereby causing an intense concentration of steam jets between the said rings near the flue axis.

3. An apparatus as in claim 1 wherein the ring has a second similar intake.

References Cited

UNITED STATES PATENTS

| 155,465 | 9/1874 | Rumely | 261—126 |
|---|---|---|---|
| 899,882 | 9/1908 | Matthews | 261—17 |
| 1,159,085 | 11/1915 | Price et al. | 261—17 |
| 1,859,190 | 5/1932 | Zane | 261—126 |
| 2,481,760 | 9/1949 | Leher | 219—381 X |
| 3,139,331 | 6/1964 | Bourdreau | 55—263 X |
| 227,420 | 5/1880 | Dunn et al. | |
| 565,036 | 8/1896 | Sands | 261—17 |
| 871,551 | 11/1907 | Younghusband | 110—119 |
| 1,016,213 | 1/1912 | Clawson. | |
| 1,089,277 | 3/1914 | Shepard | 62—261 X |
| 1,135,681 | 4/1915 | Georgy et al. | 261—118 X |
| 1,657,375 | 1/1928 | Dinardo | 261—126 X |
| 1,774,554 | 9/1930 | Honigmann et al. | 55—263 X |
| 1,792,587 | 2/1931 | Jackson | 261—116 |
| 1,909,825 | 5/1933 | Hahn et al. | 55—106 X |
| 2,075,221 | 3/1937 | Palenzuela | 261—117 |
| 2,648,108 | 8/1953 | Pentz | 21—95 |
| 2,840,297 | 6/1958 | Hickman | 230—101 |
| 3,215,415 | 11/1965 | Stephens et al. | 261—118 |
| 2,594,171 | 4/1952 | Howell | 261—115 X |

FOREIGN PATENTS

| 30,372 | 3/1905 | Austria. |
|---|---|---|
| 25,954 | 1910 | Great Britain. |
| 32,077 | 4/1921 | Norway. |

DENNIS E. TALBERT, JR., Primary Examiner

U.S. Cl. X.R.

21—53, 56, 74, 119; 23—2; 55—267, 279, 385; 110—119, 184; 219—275, 381; 261—115, 126; 266—15